May 19, 1970 — R. H. CRANE — 3,512,624
CONVEYED ARTICLE POSITIONING APPARATUS
Filed July 3, 1968 — 2 Sheets-Sheet 1

INVENTOR
ROBERT H. CRANE
Beaman & Beaman
ATTORNEYS

INVENTOR
ROBERT H. CRANE

ATTORNEYS

United States Patent Office 3,512,624
Patented May 19, 1970

3,512,624
CONVEYED ARTICLE POSITIONING APPARATUS
Robert H. Crane, Union Lake, Mich., assignor to Sparton Corporation, Jackson, Mich., a corporation of Ohio
Filed July 3, 1968, Ser. No. 742,440
Int. Cl. B23q 7/00
U.S. Cl. 198—19                   8 Claims

ABSTRACT OF THE DISCLOSURE

Apparatus for controlling a conveyor whereby a conveyed article may be positioned relative to a fixed location adjacent the conveyor at a predetermined location relative to the length of the article. The apparatus includes means for sensing the length of the conveyed article in the direction of conveyance, and means for sensing the arrival of the article at the position adjacent the conveyor at which the article is to be stopped, therein comparison timer means are actuated which compares the length of the article with the desired location upon the article at which the article is to be stopped. The apparatus finds use with automated banding, nailing, printing and other secondary article operations which are to occur at a predetermined position on the conveyed article.

BACKGROUND OF THE INVENTION

The invention pertains to conveyor control devices of an automatic type wherein the control of the conveyor is accomplished through means sensing the physical characteristics of the conveyed article, and wherein the conveyed article is to be stopped at a predetermined location relative to a fixed station adjacent the conveyor.

With automated equipment it is often desired to perform a banding, nailing, printing or other operation upon a conveyed article at a specific location on the article with respect to its particular dimensions. For instances, in packages requiring a banding strap to be passed about the package equidistant from the ends thereof, it is necessary to hold the package in a centered relationship relative to the banding apparatus during banding.

Various devices have been used to position a conveyed article relative to a secondary operation station located adjacent the conveyor. For instance, the station may include means for grasping the article and maintaining the article stationary during the banding or second operation being performed. In such instances where the movement of the article is restrained, jamming of the conveyor can occur due to conveyed articles "backing up" at the station which restrains article movement.

Conveyor controls have been used for stopping and starting conveyors in order to position conveyed articles at predetermined locations relative to a secondary operation station by using a "add-subtract" counter which is actuated by electrical impulses received from a cam operated limit switch, photoelectric scanning disk, or similar devices. Where this type of "add-subtract" counter is used to achieve an accuracy of plus or minus one inch at a conveyed rate of thirty feet per minute it is necessary to feed 360 impulses per minute into the "add" side and "subtract" at 720 impulses per minute. Such counters are commonly rated at 500 impulses per minute at a maximum rate. Thus, at 360 impulses per minute the maximum capabilities of the apparatus are being exceeded, and it is necessary to maintain the conveyor rate relatively slow in order to use this type of control accurately. Also, the clock-like construction of "add-subtract" controls requires skilled maintenance, and this type of apparatus is not of the rugged, dependable characteristics required with most conveyor installations.

SUMMARY OF THE INVENTION

The invention pertains to a conveyed article positioning apparatus which is of a rugged, yet simple, construction, and is able to very accurately position conveyed articles relative to a secondary operation station disposed adjacent the conveyor.

The apparatus of the invention includes a photo-electric cell or other sensing element, which senses the duration of time that an article conveyed at a uniform rate requires to pass a fixed location. This duration of time thereby represents the length of the conveyed article in the direction of conveyance. At the secondary operation station means are provided for sensing the arrival of the forward end of the conveyed article. At this time a timer mechanism is energized which is operatvely associated with the mechanism recording the length of the conveyed article and upon a predetermined portion of the article being received into the secondary operation station the timer stops the conveyor and permits the secondary operation to take place on the stationary article. After the secondary operation has been completed the conveyor is restarted and the next cycle is repeated.

In order to simplify the implementation of the inventive concept as set forth above the sensing of the length of the conveyed article and the comparison of this length with the length of the article received into the secondary operation station is accomplished by a simple two-motor system. During the time that the conveyed article is interrupting a photoelectric beam a first electric motor is rotating one element of the conveyor stop means through a predetermined arc less than 360°. Upon the forward end of the conveyed article reaching the secondary operation station, fixed adjacent the conveyor, a second electric motor begins rotating a second element of the conveyor stop mechanism through an arc and path of movement corresponding to that of the first element. However, the second electric motor output is rotating at a ratio of velocity with respect to the rate of velocity output of the first motor equal to the inverse of the fraction of the conveyed article length which is to pass into the secondary operation station. Thus, if the article is to be banded centrally intermediate its ends, one half of the conveyed article must be received into the secondary operation station before the conveyor is stopped. The second motor output thereby will be rotating at twice the angular velocity as the first motor, and upon the second element engaging the first element of the conveyor stop the conveyor will be stopped and the article positioned as desired with respect to the secondary operation station.

Upon the operation occurring at the station being completed the conveyor may be started manually or by an automatic control instituted by the station apparatus, and the cycle repeats itself.

In that the first and second elements always begin the cycle from an engaging and common location, each of the elements rotates through an identical arc during each cycle. There is no need to reset the mechanism in that each arc of movement of the element is less than 360°, and the motors of the timer mechanism are merely started and stopped during the operation of the apparatus.

It is therefore an object of the invention to provide a simplified mechanism for performing the functions set forth which is rugged and dependable in operation, and does not require the attention of a skilled operator for maintenance purposes.

An additional object of the invention is to provide means for accurately positioning conveyed articles relative to a fixed location adjacent the conveyor wherein the articles may be accurately positioned even in conveyor installations having a relatively high rate of conveyed movement.

BRIEF DESCRIPTION OF THE DRAWING

The aforementioned objects of the invention will be apparent from the following description and accompanying drawing wherein.

DESCRIPTION OF THE PREFERRED EMBODIMENT

Figure 1:
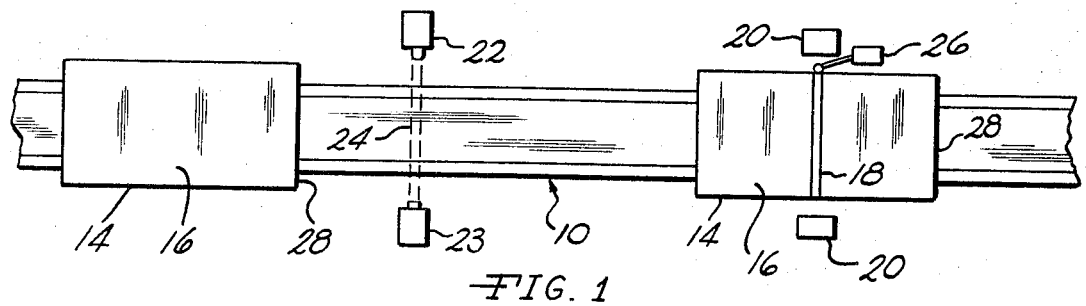
FIG. 1 is a plan, schematic, view of a conveyor and conveyed articles, and associated apparatus, used in the practice of the invention.

FIG. 1 illustrates, in an elementary manner, a conveyor arrangement in which the concept of the invention may be utilized. A conveyor is represented at 10, which may be of any conventional power driven type driven by an electric motor 12, FIG. 8, at a uniform rate of movement. The conveyor is of such design that upon deenergization of the drive motor 12 the conveyor will immediately stop its movement.

The articles being conveyed are indicated at 14, and may or may not be of the rectangular form illustrated. For purpose of illustration it is assumed that the articles 14 consist of boxes or crates having a cover 16 which is to be strapped in position by a band 18. The banding or strapping of the articles is automatically produced by a banding machine 20, FIG. 1, of any conventional type. The banding machine 20 constitutes a secondary operation or work station adjacent the conveyor.

In FIG. 1 the direction of conveyance of the articles is toward the right, and a photo-electric cell device 22, which includes light 23, projects a light beam 24 across the path of conveyed article movement which will be interrupted by the article for a duration of time determined by the rate of movement of the conveyor and the length of the article in the direction of conveyance.

An article sensing switch 26 is disposed at the banding station 20 and is adapted to engage the forward end 28 of the articles upon an article arriving at the banding station, and the switch 26 will remain closed as the article is received within the banding station under its movement upon the conveyor.

In that the photo-electric device 22 senses the length of the articles 14 and the switch 26 senses the arrival of the articles at the banding station, it is possible, by the employment of timing means, to determine the location of the center of the articles 14 with respect to the longitudinal length of the article and stop the conveyor at a point which will place the center of the article intermediate the banding machine components such that the banding strap 18 may be accurately centered with respect to the longitudinal length of the associated article.

Figure 4:
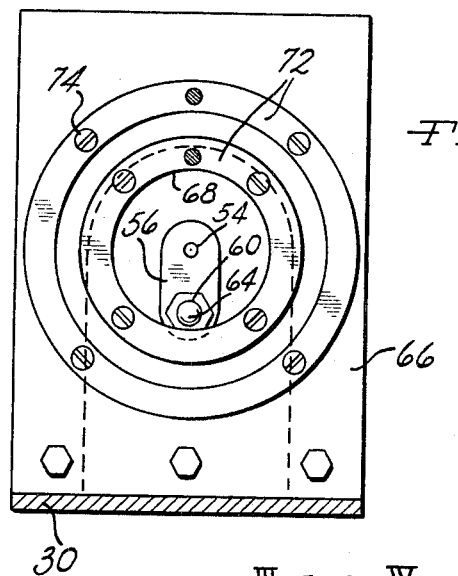
FIG. 4 is an elevational sectional view taken along section IV—IV of FIG. 2, FIGS. 5 through 7 are enlarged sectional views taken along section V—V of FIG. 2 illustrating the conveyor stop mechanism elements in various positions of operation.
Figure 3:
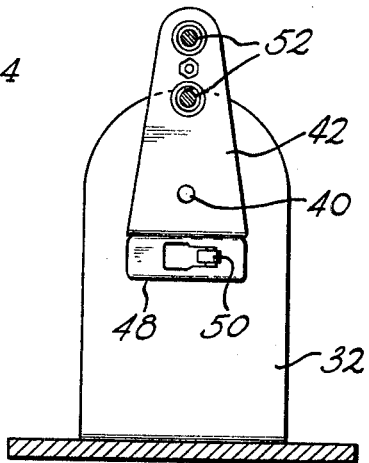
FIG. 3 is an elevational, sectional view taken along section III—III of FIG. 2.
Figure 2:
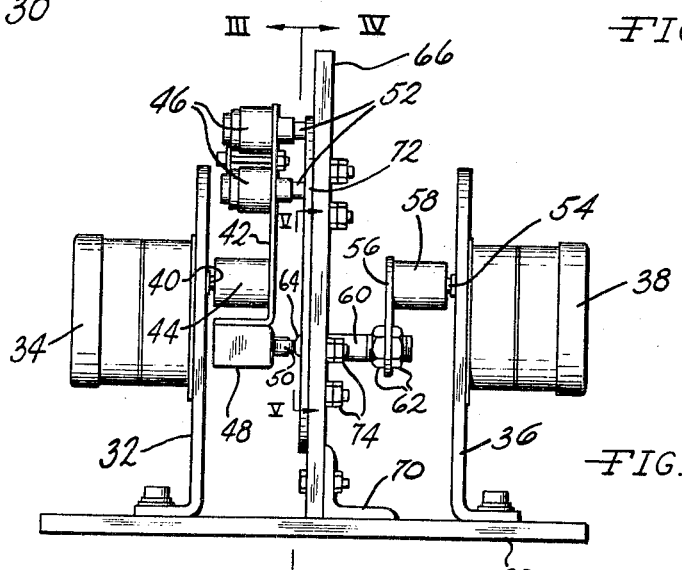
FIG. 2 is an elevational view of the timer and conveyor control mechanism in accord with the invention.

The simplified and unique timing apparatus used in accord with the invention is best illustrated in FIGS. 2 through 4. The timing mechanism includes a base plate 30 upon which motor support brackets of an L-shaped configuration are mounted. The motor bracket 32 constitutes the support for an electric motor 34, and the bracket 36 supports the electric motor 38.

The electric motor 34 includes a gear train having an output shaft 40, and in a commercial embodiment of the invention the shaft 40 rotates at 2 r.p.m. A limit switch mounting bracket 42 is mounted upon the shaft 40 by means of the annular hub 44. The bracket 42 includes a radially extending portion upon which a pair of radially spaced electric brush holders 46 are mounted. At the other end of the bracket an electric limit switch 48 is mounted which includes an actuating arm having a roller 50 mounted thereon. A pair of spring biased brushes 52, such as of carbon, are mounted within the holders 46 and are biased toward the right, FIG. 2, for engagement with commutator rings, as will be later described. Electrical conductors, not shown, connect the brushes and holders to the electric switch 48.

The electric motor 38 also includes an integral transmission, and an output shaft 54 upon which the limit switch actuator or trigger mounting bracket 56 is mounted by means of hub 58. The output shaft 54 rotates at an angular rate greater than that of output shaft 40, and the difference in the rate of rotation between the shafts depends upon the location upon the conveyed article at which the banding strap 18 is to be located. In the illustrated embodiment it is desired to center the banding strap 18 between the ends of the article, and in this instance the output shaft 54 will rotate at 4 r.p.m., i.e. twice the angular rate of rotation as the output shaft 40.

The bracket 56 includes a switch engaging stud 60 affixed thereto by nuts 62. The stud 60 includes a rounded outer end 64 which is disposed toward the limit switch 48, FIG. 2, and is adapted to be engaged by the switch roller 50.

Intermediate the motor brackets 32 and 36 a rectangular plate 66, formed of dielectric material, such as fiberboard or plexiglass, is located having a circular opening 68, FIG. 4 defined therein through which the stud 60 projects. The axis of the openings 68 coincides with the aligned axes of the shafts 40 and 54. The plate 66 is mounted on the base 30 by brackets 70.

A pair of annular commutator rings 72 are affixed to the plate 66 by flat head screws 74, and the commutator rings are concentric with shaft 40 and located as to be engaged by the brushes 52. Conductors, not shown, connect the commutator ring screws with the appropriate electrical equipment as will be later described.

The operation of the apparatus in accord with the invention will now be described.

Initially, the timer mechanism shown in FIGS. 2 through 4 will be in a relationship shown in these figures resulting from the previous cycle, i.e., and the shaft 54 will have rotated the stud 60 such that the high point of the stud end 64 is engaging the switch roller 50, and has actuated the switch 48 from the previous cycle.

Upon the conveyor 10 beginning its next cycle of movement, the conveyor motor 12 will be energized to transport the articles 14 toward the right, FIG. 1. The left article 14 is approaching the photo-electric beam 24 and as soon as the forward end 28 of the article interrupts the beam this condition is sensed by the amplifier and relay 76, FIG. 8, which includes a relay for closing switch 78, FIG. 8, and thereby energizing electric motor 34. Electric motor 34 begins to rotate shaft 40 in a counterclockwise direction, FIG. 3, at the rate of 2 r.p.m. Rotation of the shaft 40, bracket 42 and switch 48 continues as long as the light beam 24 is interrupted by the article 14. As soon as the rearward end of the article passes through the light beam this condition will be sensed by the amplifier 76 which will immediately open the switch 78 and stop the motor 34.

Figure 5:
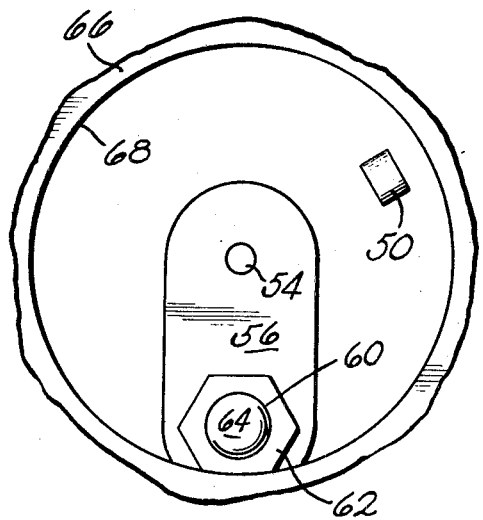

The condition at this point is represented in FIG. 5 wherein the switch roller 50 has rotated through a circular path of movement of approximately 250° in a clockwise direction as viewed in FIG. 5. It will be appreciated that the initial starting point of the roller 50 was approximately at the center of the stud end 64, FIG. 5.

The length of the path of movement of the roller 50 from the position of FIG. 3 to that of FIG. 5 represents the length of the article 14, and in this manner the timer mechanism "stores" this information.

The switch 26 is located at the point of banding or strapping of the article, and this switch will be energized by the forward end 28 of the article whose length has just been sensed upon the article reaching the banding station. Immediately upon the switch 26 being engaged by the forward end of the conveyed article the switch 26 energizes the electric motor 38 which begins to rotate the output shaft 54 at 4 r.p.m. The stud 60 is thus rotated in an arcuate path of movement corresponding to that of the roller 50, and this path of movement is also in the clockwise direction as viewed in FIGS. 4 through 7.

As the switch 26 engages the article 14 as it moves through the banding station 20 the motor 38 will continue to run and rotate the stud 60 in a circular path toward the rollers 50. Upon the stud 60 reaching the position of FIG. 6 wherein the stud end 64 engages and moves the roller 50 the switch 48 will be closed. This closing of the switch 48 immediately actuates relay coil 80 through conductors attached to screws 74 which opens the conveyor motor switch 82 stopping the conveyor motor 12, and stopping the movement of the article 14 such that the center of the article will be directly disposed in line with the banding apparatus 20. The energizing of coil 80 by switch 48 also opens the switch 81 which stops the motor 38 as soon as switch 48 is closed. Thus, a common starting location for roller 50 and stud 60 is assured for the next cycle. The switch 81 will close as the circuit resets for the next cycle. In that the conveyor has now stopped moving, the banding equipment may be energized by automatic means responsive to the deenergization of the conveyor motor, and banding of the aligned article proceeds.

Figure 6:
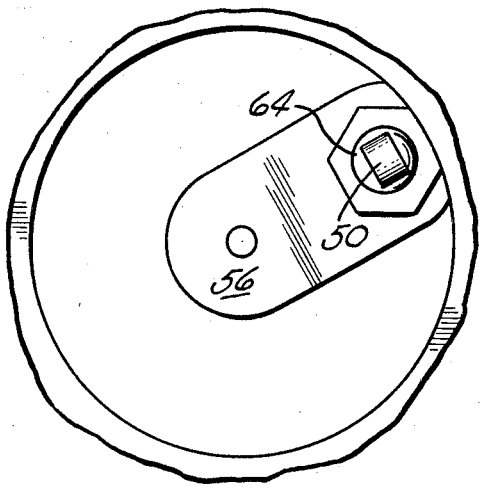

Of course, it will be appreciated that the stopping of the article 14 such that the banding will occur exactly at the "center" of the article is a result of a fact that the output shaft 54 rotates at twice the angular rate as the output shaft 40. Thus, both the roller 50 and the stud 60 pass through identical angular paths of movement of approximately 250°. However, in that the output shaft 54 is rotating at twice the angular velocity as the shaft 40 the duration of time for the stud 60 to move from the position of FIG. 5 to that of FIG. 6 is one-half of the time required for the roller 50 to move through the same angular displacement and the stopping of the article 14 will therefore be at the "center" thereof.

Upon the banding operation, or other secondary operation, being completed at the banding machine 20 the conveyor motor 12 may be manually started by a pushbutton 84, or may be automatically started by appropriate electrical signals received from the banding apparatus.

In order to prevent the switch 26 from energizing the motor 38 as the rear "half" of the article 14 passes from the banding station 20 a time delay switch 86 may be included in the circuitry to the motor 38 operated by the circuit energizing motor 12, or other appropriate circuit, to prevent movement of the stud 60 until the appropriate time during the next cycle.

Figure 7:
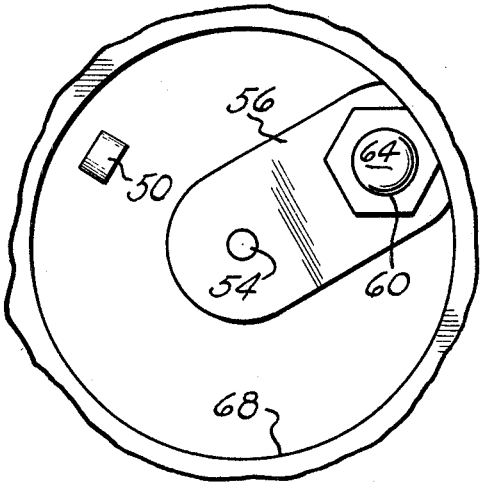

FIG. 7 represents the position of the switch roller 50 after the article 14 immediately following the article previously banded has passed through the light beam 24. In that the articles 14 illustrated are identical in length, the sensing of the length of the next article will cause switch 48 and switch roller 50 to move through the same angular path of movement as in the previous cycle, and this condition is illustrated in FIG. 7. Upon the motor 38 being energized by the switch 26 the stud 60 will again be rotated to engage the roller 50 and stop the conveyor for the banding of the next article.

Figure 8:
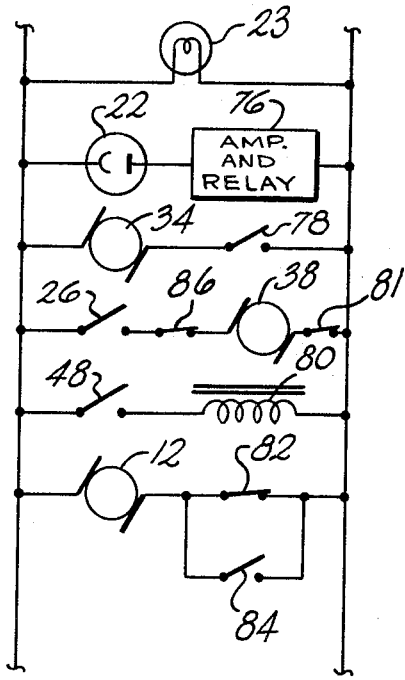
FIG. 8 is a simplified circuit diagram which may be used in accord with the described invention.

It will be appreciated that the apparatus of the invention is of a simple, dependable and rugged nature which permits adjustment and maintenance by unskilled personnel. The control circuit shown in FIG. 8 is for purposes of illustrating only the basic electrical arrangement, and all of the necessary interlocks and components are not shown, and various wiring diagrams may be used by those skilled in the art within the scope of the invention.

By varying the rate of rotation of the output shaft 54 with respect to that of the shaft 40 the articles 14 may be positioned as desired with respect to the station 20. For insance, if the band 18 is to be located one-third of the length of the article from the forward end 28 the shaft 54 will have a rate of rotation three times that of the shaft 40. Should it be desired to locate the band three-quarters of the article length from the end 28 the shaft 54 will rotate at a rate one and one-third that of the shaft 40.

In the described arrangement only one timer is used and it is assumed that only one band is to be placed on each article. Should it be desired to locate three bands along the article at intervals representing one-quarter of the longitudinal length of the articles, a total of three identical timer units would be employed operating in a sequential manner. In such an arrangement all three timer units would include motors 34 rotating a limit switch through an arc corresponding to the length of the article. However, only one switch 48 of a timer would be used at a time in order to control the stopping and starting of the conveyor motor. By sequentially employing the switches 48 of the three timer units to control the stopping of the conveyor three stops of each article within the banding station can be accomplished to permit three bands to be placed about the article.

In the illustrated embodiment motor 34 is shown as rotating the limit switch 48 while the motor 38 rotates the stud 60. It will be appreciated that a switch actuating stud, or equivalent device, could be rotated by the motor 34, and the switch could be rotated by the motor 38, assuming the commutator rings were placed as to be feasible with this change in the arrangement.

It is appreciated that various modifications to the inventive concept may be apparent to those skilled in the art without departing from the spirit and scope thereof, and it is intended that the invention be defined only by the following claims:

I claim:

1. Apparatus for positioning an article conveyed on a conveyor relative to a predetermined location adjacent the conveyor, comprising, in combination, a power driven conveyor, conveyor stop means controlling stopping of said conveyor, first article sensing means sensing the length of the conveyed article, second article sensing means sensing the arrival of the forwardmost portion of the conveyed article at a given location, and comparison timer means initiated by said second article sensing means operatively related to said first article sensing means as to have a duration of operation proportioned to the length of the conveyed article controlling said conveyor stop means to stop said conveyor and position said article at a predetermined position relative to said predetermined location.

2. Apparatus for positioning an article conveyed on a conveyor relative to a predetermined location adjacent the conveyor comprising, in combination, a uniformly moving power driven conveyor, conveyor control stop means controlling stopping of said conveyor, said stop means comprising first and second elements, first motor means adapted to move said first conveyor control stop means element through a path of movement at a uniform rate, article sensing means sensing the duration of time necessary for a predetermined portion of a conveyed article to move past a fixed location adjacent said conveyor, first motor energizing means energizing said first motor for a duration of time proportional to the duration of time sensed by said article sensing means as the conveyed article moves past said fixed location, the second element of said conveyor control stop means being mounted adjacent said first element for selective engagement therewith, second motor means adapted to move said second element through a path of movement substantially corresponding to that of said first element, said second motor means adapted to move said second element at a predetermined uniform rate greater than the rate of movement of said first element, and second motor energizing means located at a predetermined position adjacent the conveyor engageable with the conveyed article energizing said second motor upon the article arriving at and moving past said predetermined location and until said first and second elements engage to actuate said stop means to stop said conveyor.

3. In an apparatus as in claim 2 wherein said predetermined position of said second motor energizing means comprises said predetermined location at which the conveyed article is located upon said conveyor being stopped.

4. In an apparatus as in claim 3 wherein one of said conveyor control stop means elements constitutes an electric switch, said first and second motor means comprise electric motors, and the other conveyor control stop means element constitutes a switch actuator.

5. In an apparatus as in claim 4 wherein said electric motors move said electric switch and switch actuator through circular paths of movement in the same direction and less than 360° during each cycle of operation.

6. In an apparatus as in claim 3 wherein said article sensing means senses the length of the conveyed article in the direction of conveyor movement and said first motor energizing means energizes said first motor for a duration of time equal to the duration of time for the conveyed article to move past said fixed location.

7. In an apparatus as in claim 6 wherein said first and second motors comprise electric motors, said first motor rotating said first element through a circular path of movement less than 360° during each cycle and said second motor rotating said second element through a circular path of movement in a like direction with respect to the path of movement of said first element, the rate of rotation of said second element being greater than that of said first element by a ratio which is the inverse of the fraction of the conveyed article length which is to pass said predetermined location before the conveyor is to be stopped.

8. In an apparatus as in claim 7 wherein one of said elements constitutes an electric switch and the other of said elements constitutes an electric switch actuator, a pair of commutator rings fixed relative to said switch and a pair of brushes connected to said switch for rotation therewith, each brush engaging a commutator ring.

References Cited

UNITED STATES PATENTS

| | | | |
|---|---|---|---|
| 1,818,646 | 8/1931 | Parker | 198—19 |
| 3,189,156 | 6/1965 | Hyer | 198—19 |

EVON C. BLUNK, Primary Examiner

A. N. GOODMAN, Assistant Examiner

U.S. Cl. X.R.

198—37, 232